Patented July 13, 1926.

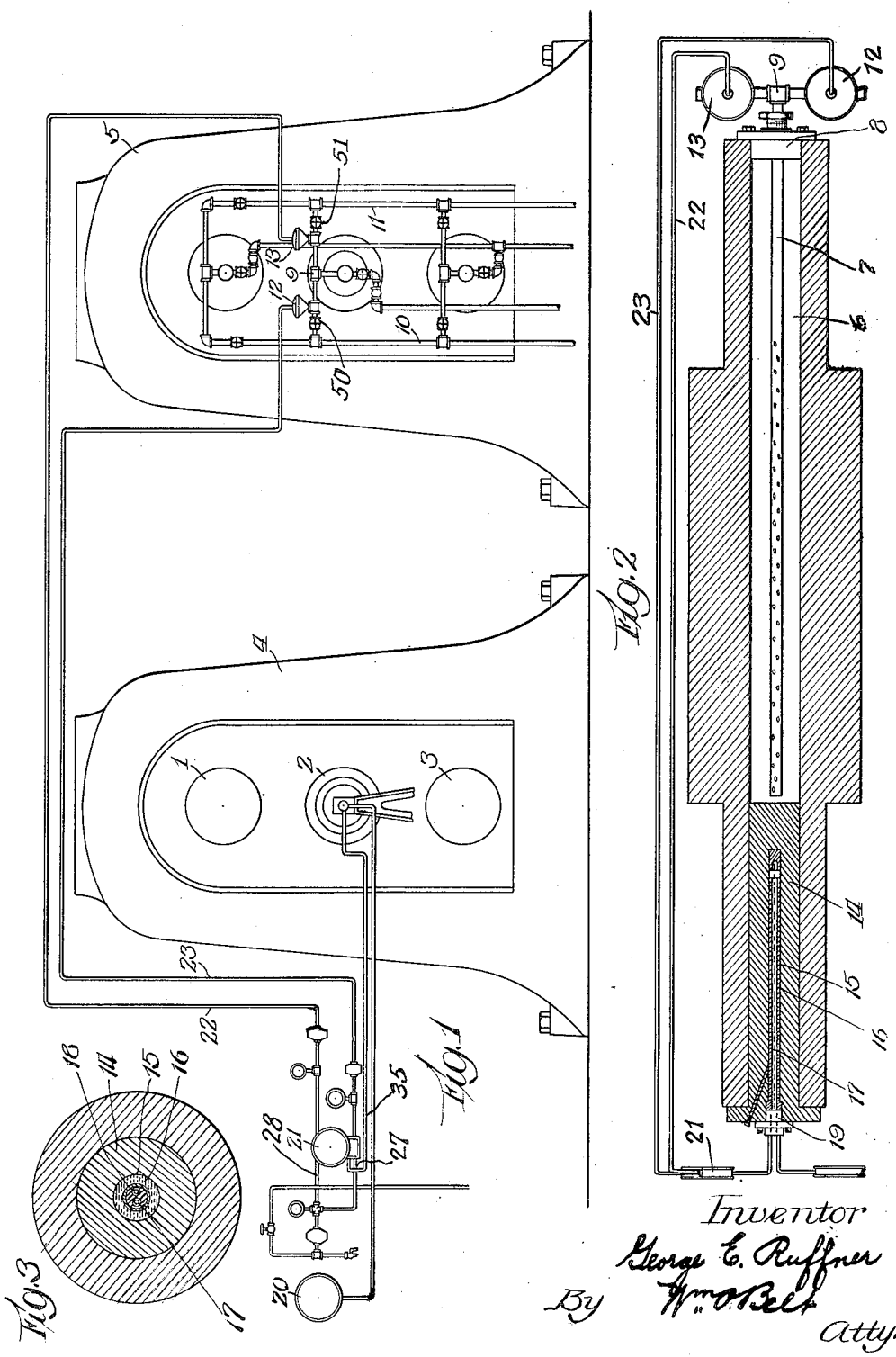

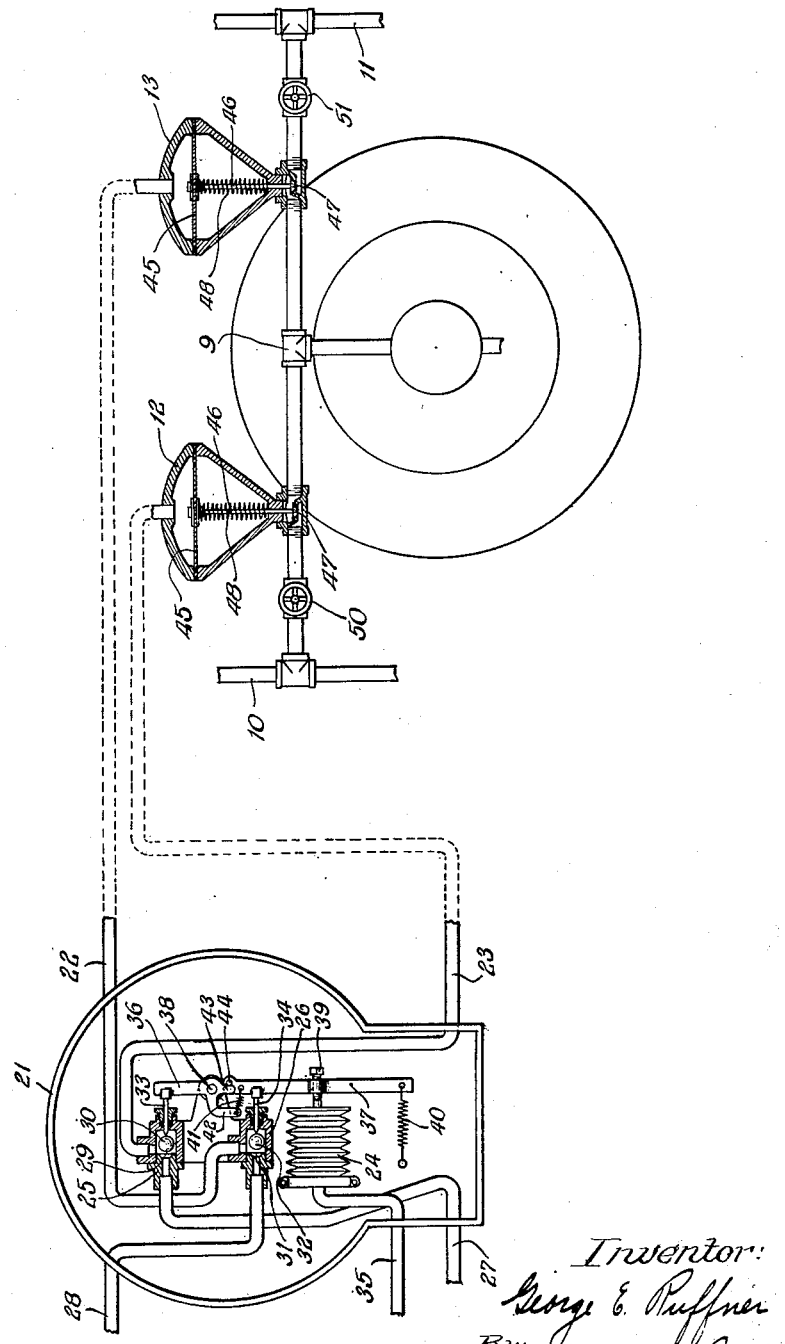

1,592,226

UNITED STATES PATENT OFFICE.

GEORGE E. RUFFNER, OF RACINE, WISCONSIN.

CALENDER TEMPERATURE CONTROL.

Application filed September 12, 1921. Serial No. 500,249.

The object of this invention is to provide automatic regulation for the temperature of the rolls such as found in calenders, mills, etc., used in the manufacture of rubber and in similar operations.

More specifically the object is to provide thermo-sensitive means for automatically regulating the device for heating and cooling the rolls of such machines whereby the temperature of the rolls can be maintained practically constant in spite of the heat generated in the operation and other causes of temperature change.

In the accompanying drawing I have illustrated one embodiment of the invention which has been found very satisfactory in practice. In said drawing—

Fig. 1 illustrates both ends of a calender or mill with the temperature control apparatus applied thereto and Fig. 2 is a sectional view of one of the rolls showing the temperature control means more or less diagrammatically.

Fig. 3 is a sectional detail.

Fig. 4 is a diagrammatic view of the temperature control apparatus.

I have illustrated the invention as applied to a well known form of calender which has three rolls, 1, 2 and 3 having their ends journaled in the frames 4 and 5 and driven by suitable gearing, not shown. One or more of these rolls is provided with a central bore 6 in which is mounted a suitable spray pipe 7 carried in a stuffing box 8 and connected by the T-connection 9 to supply pipes 10 and 11 for water and steam respectively. The admission of steam and water is controlled by valves 12 and 13 and in practice these have been operated manually to apply the approximate heating or cooling required by the circumstances. Different conditions of stock require somewhat different temperatures of the rolls and more or less heat is generated by the calendering. Heretofore the temperatures have been estimated and the corrections have been made by guess, with the result that there has been a constantly varying product and considerable loss to spoiled stock.

With my invention a thermo-sensitive element is thermally connected with the operating surface of the roll and operates means for opening and closing the valves 12 and 13 as may be necessary to increase or decrease the temperature of the roll to compensate for loss or gain of heat resulting from the circumstances of the work.

I have found that very satisfactory results can be obtained by boring out the end of the roll opposite to that in which the stuffing box 8 is mounted and pressing therein a cast iron plug 14 having a suitable bore 15 filled with a bath of mercury or other suitable conducting substance 16 in which are inserted a thermo-sensitive bulb 17 and a thermometer bulb 18. These bulbs are, of course, suitably mounted in a proper stuffing box 19 so that they may remain stationary while the roll rotates. As illustrated the thermometer is of a recording type having the dial 20 on which a record of the temperatures is traced. The thermo-sensitive means here shown includes an ether bulb 17 which operates the valves in a casing 21 which control the air pressure in tubes 22 and 23 leading to valves 12 and 13.

With this arrangement when the temperature of the roll rises above the predetermined point the diaphragm operated by the expanding ether closes or reduces the opening of valve 13 and opens or increases the opening of the valve 12 whereby steam is cut off and water is admitted to reduce the temperature of the roll. As soon as the temperature drops below the desired point the diaphragm is operated in the reverse direction and steam is admitted and the water cut off. Meanwhile the recording thermometer is making a record of the temperature variation.

As shown in Fig. 4, the casing 21 encloses a diaphragm 24 and a plurality of valves 25 and 26. The valves 25 and 26 provide means for controlling the air pressures in the tubes 22 and 23, the valve 25 being associated with the tube 23 and the valve 26 being associated with the tube 22. The valves 25 and 26 are connected to an air compressor (not shown) or the like through tubes 27 and 28 respectively. The valve 25 is provided with a valve seat 29 which may be engaged by a ball 30 to prevent communication between the tube 27 and the tube 23. In a like manner, the valve 26 is provided with a valve seat 31 which may be engaged by a ball 32 to prevent communication between the tube 28 and the tube 22. A pin 33 slidably journaled in the valve 25 and the pin 34 slidably journaled in the valve 26 are actuated by suitable means to bring the balls 30 and 32 in engagement with their respective seats when certain conditions exist. The means for actuating the pins 33 and 34 comprises the diaphragm 24 which is connected to the ether bulb 17 by a tube 35. It is readily understood that the diaphragm 24 will expand and contract with the variations in temperature in the roll and that the expansion and contraction of the diaphragm may be employed to angularly displace a plurality of levers 36 and 37 about a common pivotal axis 38. To this end, the lever 37 is provided with an adjustable set screw 39 adapted to be engaged by the diaphragm 24, the lever 37 being yieldingly held by a helical spring 40 in a position wherein the set screw 39 engages the diaphragm 24. Means are provided for yieldingly holding the levers 36 and 37 in the positions relative to each other shown in Fig. 4, the means comprising a spring 41 which has one of its ends secured to an arm 42 formed integral with the lever 36 and the other of its ends secured to the lever 37. It is apparent that the spring 41 will tend to hold the lever 36 in a position wherein a lug 43 formed thereon rests against a pin 44 carried by the lever 37.

When the correct temperature obtains in the roll, the valves 25 and 26 will permit communication between the tubes 27 and 28 and the tubes 23 and 22 respectively. The balls 30 and 32, the diaphragm 24 and the levers 36 and 37 will then be in the relative positions shown in Fig. 4 and the valves 12 and 13 will be closed. Each of the valves 12 and 13 comprises a diaphragm 45 to which is secured a valve stem 46 carrying a valve disk 47. A helical spring 48 disposed around the valve stem 46 tends to hold the valve disk 47 in its open position. However, whenever the valves 25 and 26 permit communication between the tubes 27 and 28 and the tubes 23 and 22 respectively, the diaphragm 45 will hold the valve disks 47 in their closed positions.

In the operation of the controlling apparatus, a rise in temperature at the operating surface of the roll will be accompanied with a rise in pressure in the diaphragm 24 which will expand to rotate the lever 37 about its pivotal axis 38, the direction of such rotation being counter clock-wise (Fig. 4). The lever 36 will move in unison with the lever 37 and will cause the pin 33 to bring the ball 30 into engagement with the valve seat 29 of the valve 25, thus preventing communication between the tube 27 and the tube 23. This will relieve the pressure acting upon the diaphragm 45 of the valve 12, thus permitting the spring 48 of that valve to bring its valve disk 47 into an open position. Cold water will then flow from the supply pipe 10 through the valve 12 and into the roll. After the roll has been brought to the proper temperature, the apparatus will, of course, return to the condition shown in Fig. 4. Should the temperature of the roll drop below the desired value, the diaphragm 24 will contract to allow the spring 40 to move the lever 37 into a position wherein it holds the ball 32 against the valve seat 31 of the valve 26, the lever 37 controlling the position of the ball 32 by means of the pin 34. When the ball 32 is at rest upon the valve seat 31, the tube 22 does not communicate with the tube 28 and the valve 13 permits a flow of steam from the supply pipe 11 to the roll. After the steam has brought the roll to the desired temperature, the apparatus is again restored to the condition shown in Fig. 4.

I have found that the structure here illustrated gives sufficiently accurate results for ordinary purposes in the manufacture of rubber and in similar operations. In cases where more accurate regulation is required it is obvious that by extending the mercury bath or other highly conducting substance nearer to the operating surface of the roll the temperature of variations at that surface may be more quickly indicated to the thermo-sensitive element and thereby effect an earlier correction of the temperature.

I have illustrated the form of thermo-sensitive means and the compressed air devices for opening and closing the water and steam valves because such apparatus is familiar to those skilled in the rubber manufacturing art and it will be understood that other types of thermo-sensitive means and other mechanism for opening and closing the valves come within the scope of this invention.

I am aware that changes in the form and proportion of parts, and in the details of construction of my invention may be made without departing from the spirit or sacrificing any of the advantages thereof, and I reserve the right to make all such changes as fairly fall within the scope of the following claims:

I claim:

1. In a device in the class described, a hollow roll, means for delivering hot and cold fluids to the interior of said roll, thermo-sensitive means within said roll and thermally connected with the operating surface thereof, means keeping said thermo-sensitive means from contact with said fluids, and means controlled by said thermo-sensitive means to regulate the flow of said fluids.

2. In a device of the class described, a hollow roll, a spray within said roll, means for delivering steam and water to said spray, valves for controlling the flow of the steam and water, and thermo-sensitive means thermally connected with said roll and isolated from contact with said steam and water for controlling said valves.

3. In a device of the class described, a hollow roll, a spray mounted within said hollow roll, means for supplying steam and water to said spray, valves for controlling the flow of the steam and water, a bath in said roll isolated from said steam and water, a thermo-sensitive means in said bath, and means operated by said thermo-sensitive means for controlling said valves.

4. In a device of the class described, a roll, means for supplying hot and cold fluids to said roll, a bath of a high conducting substance in said roll, thermo-sensitive devices mounted in said bath, means operated by said thermo-sensitive devices for controlling flow of the fluids to said roll, and a recording thermometer mounted in said bath.

5. In a device of the class described, a hollow roll, means for supplying a fluid to said roll, differential temperatures obtaining in said roll and said fluid, a bath in said roll isolated from said fluid, a thermo-sensitive means in said bath, and means operated by said thermo-sensitive means for controlling the flow of said fluid to said roll.

6. In a device of the class described, a hollow roll, means for supplying a fluid to said roll, differential temperatures obtaining in said roll and said fluid, a bath in close thermal connection with the operating surface of said roll, a thermo-sensitive means in said bath, and means operated by said thermo-sensitive means for controlling the flow of said fluid to said roll.

7. In a device of the class described, a roll having a plurality of chambers formed therein, means for supplying a fluid to one of said chambers, differential temperatures obtaining in said roll and said fluid, a thermo-sensitive means in the other of said chambers, and means operated by said thermo-sensitive means for controlling the flow of said fluid to said chamber.

8. In a device of the class described, a roll having a plurality of chambers formed therein, means for supplying a fluid to one of said chambers, differential temperatures obtaining in said roll and said fluid, a bath in the other of said chambers, a thermo-sensitive means in said bath, and means operated by said thermo-sensitive means for controlling the flow of said fluid to said chamber.

GEORGE E. RUFFNER.